Aug. 24, 1965     D. KIRK     3,202,271
EASY OPENING CONTAINER
Filed Dec. 11, 1962
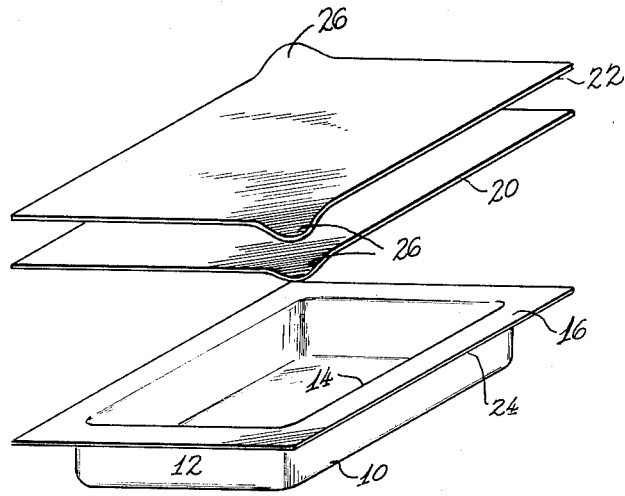
Fig 1
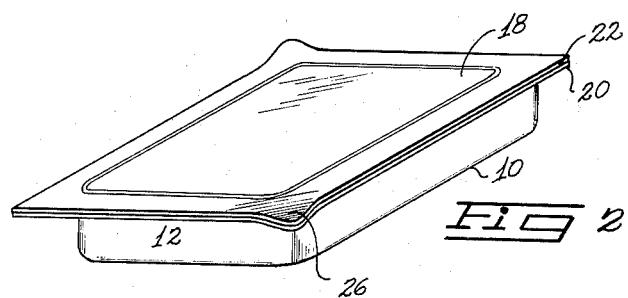
Fig 2
Fig 3
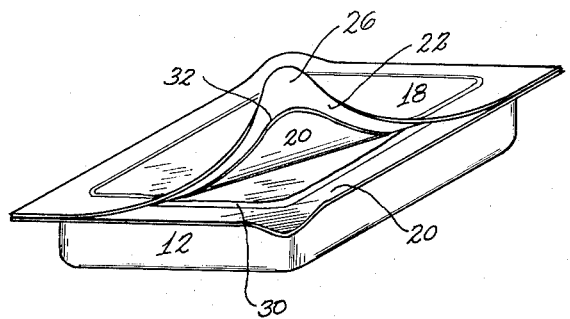
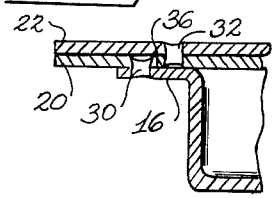
Fig 4
INVENTOR.
Douglas Kirk
BY
Olson, Mecklenburger, von Holst,
Pendleton & Neuman Attys 3,202,271
EASY OPENING CONTAINER
Douglas Kirk, Barrington, Ill., assignor to The Quaker Oats Company, Chicago, Ill., a corporation of New Jersey
Filed Dec. 11, 1962, Ser. No. 243,778
5 Claims. (Cl. 206—56)

This invention relates to containers molded from a thermoplastic material which may be tightly sealed and which nevertheless may be opened easily by simple manual manipulation.

In recent years various products of perishable and durable nature have been packaged in containers molded from plastic materials and particularly thermoplastic materials which can be heat sealed. One type of container employed for packaging such items as frozen foods and the like is the tray pack container which can be molded from heat-sealable thermoplastic materials such as polyethylene, polypropylene, vinyl chloride acetate and the like. The tray pack is provided with a lid formed of a heat-sealable thermoplastic material generally the same material as in the tray pack itself. Sealing of the container is conveniently accomplished by fusing the lid and tray pack together by means of heat and pressure after the contents of the container are placed therewithin. This type of container, after being properly heat-sealed, is substantially impervious to vapors, moisture and satisfactorily protects the contents thereof against contamination from external sources. These containers can be produced relatively inexpensively in a variety of shapes and sizes and possess the additional advantage of being submersible in hot water whereby the contents can be heated as is sometimes desired when certain food items are packaged.

While containers of this type possess numerous advantages as indicated, considerable difficulty is frequently experienced in opening the package. With the thermoplastic materials used to form the containers, it is extremely difficult to make a clean straight tear when attempting to remove the cover from the tray pack; the tear generally following a haphazard, unpredictable course. Moreover, with a tight bond or fusion between the lid and the tray pack it is virtually impossible to initiate a tear therebetween. The difficulties in opening these containers are further increased when the containers are subjected to heat as when the contents are heated while in the container.

It is an object of the invention to provide a container molded from a heat-sealable thermoplastic material and having a cover sealed thereto in such manner that the cover can be readily torn therefrom along a definite predetermined course.

A further object of the invention is to provide a container comprising a body portion and cover therefor both of which are formed of a thermoplastic heat-sealable material in which the cover is removable by tearing along a predetermined tear line.

It is another object of the invention to provide a container comprising a body portion and a cover therefor both of which are formed of a thermoplastic heat-sealable material in which the cover is removable by tearing along a predetermined tear line extending around the entire periphery of the interior of the container to give ready access to the contents thereof.

It is a still further object of the invention to provide a container comprising a body portion and cover therefor both of which are formed of a thermoplastic heat-sealable material in which the cover is removable by tearing along a predetermined tear line so located as to provide ready access to the contents of the container while minimizing the possibility of contacting sharp or projecting edges of the tear.

It is a still further object of the invention to provide a container molded from a heat-sealable thermoplastic material and having a cover sealed thereto so as to be substantially impervious to vapors and moisture and which can be immersed in hot water for the purpose of heating the contents thereof after which the cover is easily removable by tearing along a predetermined tear line.

Other objects and advantages of the invention will become apparent from the following detailed description taken in connection with the accompanying drawings in which:

FIGURE 1 is a perspective view showing the tray pack and the various sheets of thermoplastic material comprising the lid therefor prior to sealing of the package.

FIG. 2 is a perspective view showing the parts assembled in sealed condition.

FIG. 3 is a perspective view of a finished package which shows the lid partially torn from the tray pack.

FIG. 4 is a vertical cross-section of the container showing the manner in which the sheets comprising the lid and the tray pack are joined.

With reference to the drawings, tray pack 10 is shown to be substantially rectangular in shape but can be of any desired shape such as circular, square, triangular and so forth. Tray pack 10 is formed by conventional molding operations from a thermoplastic material such as polyethylene, polypropylene, polyvinyl chloride or the like and has a body portion 12, the mouth 14 of which is surrounded by the integral planar flange 16.

The container lid 18 comprises an inner sheet or cover 20 and an outer sheet or cover 22 with the edges thereof being substantially co-extensive with the outer edge 24 of the flange 16. The covers 20 and 22 are preferably but not necessarily formed of the same thermoplastic material as the tray pack 10 and are provided with a pull-tab 26, which preferably extends beyond the marginal edge of the associated border flange 16. One or more such pull-tabs can be provided for peeling the lid from the tray pack and it is sometimes preferable to have two sets of the peeling tabs disposed diagonally from each other. The covers 20 and 22 can be continuous or one of said covers can have a cut-out center portion or one of the said covers can comprise merely a strip of material of substantially less area than the other cover. The critical feature of the invention is that the covers are joined in the manner described. The tray pack 10 can vary in thickness depending upon its intended application and the caliper strength desired. For example, the thickness of the tray packs often range from 0.003 to 0.40 inch more or less.

After placing the contents of the package in the body portion 12 of the tray pack, the inner cover 20 is placed thereover with its peripheral edges substantially coincident with those of flanges 16. The inner cover 20 is sealed to flange 16 by means of heat and pressure in a conventional manner to form a seal 30 extending the entire length of the flanges 16. The line of heat seal 30 is disposed in parallel relationship and toward the peripheral edge of the flanges 16.

Sealing of the container is completed by super-imposing outer cover 22 on inner cover 20 and uniting the two by heat seal 32. The line of heat seal 32 joining the inner and outer covers 20 and 22 parallels and is coextensive in length with heat seal 30. Heat seal 32 is spaced from heat seal 30 on the inner side thereof away from the peripheral edge of the flange 16. It is essential that there is no overlapping between the heat seals 30 and 32 since to do so would, in effect, unite each of the covers 20 and 22 to the flange 16 in a 3-ply construction, whereas, in accordance with the invention, it is essential that the heat seals 30 and 32 uniting two plies of material represent areas of reinforced strength with an unreinforced area 36 residing therebetween. The area 36 forms a track or tear line along which the tear progresses when peeling the lid 18 from the tray pack 10.

In practice the spacing between heat seals 30 and 32, that is the area designated 36, can be from about 0.001 to 0.500 inch or more depending upon the overall size of the container, thickness of the plies and the flange 16. It is preferable to have area 36 of relatively narrow width so as to achieve maximum control over the orientation of the tear. On a tray pack formed of polyethylene having a planar flange of about 0.75 inch a spacing between the heat seals 30 and 32 of 1/64 inch is eminently satisfactory.

Heat seals 30 and 32 can be made in conventional manner using suitable heat bars or rollers. The flange 16 on tray jack 10 can be suitably supported during the heat sealing operations to permit the application of sufficient pressure to form the desired seals. It should be noted that in forming the seal 32 the heat and pressure applied is not sufficiently great as to fuse both covers 20 and 22 to the flanges 16.

The package is opened in the manner shown in FIG. 3, the pull-tab 26 is grasped and pulled upwardly. Upon so doing, a tear initiates and progresses along the tear line or area 36 between the respective heat seals 30 and 32. It will be noted that the area 36 disposed between the two seals 30 and 32 is relatively unreinforced and in effect represents only a single ply of material while the adjacent heat seals 30 and 32 are reinforced areas representing a merger of two plies of material. The tendency, therefore, is for the tear to initiate and progress along the tear track 36. Inasmuch as seal 32 unites the inner cover 20 and outer cover 22 with the two forming a single relatively thick sheet of thermoplastic material (lid 18) the tear progresses along the periphery thereof and the lid is removed from the tray pack to expose the entire contents thereof.

The container of the invention is of a design particularly useful for packaging individual servings of food products in that it is constructed and arranged so that when it is opened the contents are fully exposed and readily extricable. The container is particularly advantageous for packaging individual servings of pet foods and the like inasmuch as the cover can be easily removed to provide ready access to the entire contents of the package, thereby permitting use of the container as a feeding dish. The location of the tear line along flange 16 and away from mouth 14 of the tray pack minimizes the possibility of the pet encountering sharp edges or projections along the tear line which could cause injury to the pet. Of course, the containers embodying the principles of the invention find wide application, such as, for instance, as disposable or "throw-away" containers for various items, drum liners, etc.

It will be apparent also, that containers embodying the principles of the invention can be fabricated in such manner that the plurality of covers forming the lid overhang the body portion so that the seal lines and tear track are located at the side of the container when sealed.

Those modifications and equivalents which fall within the spirit of the invention and the scope of the appended claims are to be considered part of the invention.

I claim:
1. A container having an item to be packaged therein and comprising a body portion of thermoplastic material and having a lid formed of a plurality of superposed sheets of material, one said sheet being joined to said body portion to provide a seal line coextensive with the periphery of said body portion and a second said sheet being joined to said first sheet to provide a second seal line substantially parallel to and substantially coextensive with said first seal line but laterally spaced therefrom thereby providing a tear track between said seal lines.

2. A container having an item to be packaged therein and comprising a body portion of a thermoplastic material and having a lid formed of at least two superposed sheets of thermoplastic material, the first of said superposed sheets being joined to said body portion to provide a seal line coextensive with the periphery of said body portion, the second of said superposed sheets being joined to said first sheet to provide a seal line substantially parallel to and substantially coextensive with said first seal line but laterally spaced therefrom thereby providing a tear track between said seal lines.

3. A container having an item to be packaged therein and comprising a body portion molded from a thermoplastic material and having a lid formed of at least two superposed sheets of thermoplastic material, said body portion having an outwardly extending planar flange around its entire periphery, the first of said superposed sheets being joined to said outwardly extending flange on said body portion to provide a seal line coextensive with the periphery of said body portion, the second of said superposed sheets being joined to said first sheet along a seal line parallel to and coextensive with the seal line joining said first sheet and said body portion but spaced inwardly therefrom away from the marginal edges of the said planar flange on the body portion to thereby provide a tear track between said seal lines.

4. A container having an item to be packaged therein and comprising a body portion molded from a thermoplastic material having an outwardly extending planar flange around its entire periphery, and a lid formed of at least two superposed sheets of thermoplastic material having an edge portion extending beyond a marginal edge of said associated planar flange, said extending portion providing a finger grip for removing said lid from said body portion, the first of said superposed sheets being joined to said outwardly extending flange on said body portion to provide a seal line coextensive with the periphery of said body portion, the second of said superposed sheets being joined to said first sheet along a seal line parallel to and coextensive with the seal line joining said first sheet and said body portion but spaced inwardly therefrom away from the marginal edges of the said planar flange on the body portion to thereby provide a tear track between said seal lines.

5. A container having an item to be packaged therein and comprising a body portion molded from a thermoplastic material and having a lid formed of at least two superposed sheets of thermoplastic material, said body portion having an outwardly extending planar flange around its enitre periphery, the first of said superposed sheets being heat sealed to said body portion to provide a heat seal line coextensive with the periphery of said body portion, the second of said superposed sheets being heat sealed to said first sheet along a heat seal line parallel to and coextensive with the heat seal line joining said first sheet and said body portion but spaced inwardly therefrom away from the marginal edges of the body portion to thereby provide a tear track between said seal lines.

References Cited by the Examiner

UNITED STATES PATENTS

| | | | |
|---|---|---|---|
| 2,554,160 | 5/51 | Von Gunten. | |
| 2,870,935 | 1/59 | Houghtelling | 220—53 |
| 2,875,563 | 3/59 | Moore | 53—39 |
| 2,940,230 | 6/60 | Flax | 53—39 |
| 2,946,478 | 7/60 | Clair et al. | |
| 2,973,087 | 2/61 | Rohdin | 206—56 |
| 3,021,001 | 2/62 | Donofrio | 206—56 |
| 3,069,273 | 12/62 | Wayne | 229—51 |
| 3,079,057 | 2/63 | Colarusso | 229—43 |
| 3,101,870 | 8/63 | Betner. | |

FRANKLIN T. GARRETT, *Primary Examiner.*